United States Patent
Arrouy et al.

(10) Patent No.: US 12,365,155 B2
(45) Date of Patent: Jul. 22, 2025

(54) PROCESS FOR MANUFACTURING AN OPTICAL ARTICLE WITH AN ADDED VALUE FILM

(71) Applicant: ESSILOR INTERNATIONAL, Charenton-le-Pont (FR)

(72) Inventors: Frédéric Arrouy, Charenton-le-Pont (FR); Gabriel Keita, Dallas, TX (US)

(73) Assignee: Essilor International, Charenton-le-pont (FR)

(*) Notice: Subject to any disclaimer, the term of this patent is extended or adjusted under 35 U.S.C. 154(b) by 339 days.

(21) Appl. No.: 17/622,103

(22) PCT Filed: Jun. 23, 2020

(86) PCT No.: PCT/EP2020/067518
§ 371 (c)(1),
(2) Date: Dec. 22, 2021

(87) PCT Pub. No.: WO2020/260291
PCT Pub. Date: Dec. 30, 2020

(65) Prior Publication Data
US 2022/0242073 A1  Aug. 4, 2022

(30) Foreign Application Priority Data
Jun. 24, 2019 (EP) .................................. 19305821

(51) Int. Cl.
*B29D 11/00* (2006.01)
*B29C 64/106* (2017.01)
(Continued)

(52) U.S. Cl.
CPC ........ *B29D 11/0073* (2013.01); *B29C 64/106* (2017.08); *B29D 11/00009* (2013.01);
(Continued)

(58) Field of Classification Search
CPC .......... B29D 11/00442; B29D 11/0073; B29D 11/00403; B32B 2305/74; B32B 2551/00; B32B 2037/1253
(Continued)

(56) References Cited

U.S. PATENT DOCUMENTS 7,455,796 B2    11/2008   Jiang et al.
8,202,392 B2 *   6/2012   Jiang .................. B29D 11/0073
                                                156/273.7
(Continued)

FOREIGN PATENT DOCUMENTS

EP    3 495 128    6/2019
WO    2006/105999  4/2006

OTHER PUBLICATIONS

International Search Report for PCT/EP2020/067518 dated Aug. 25, 2020, 5 pages.
Written Opinion of the ISA for PCT/EP2020/067518 dated Aug. 25, 2020, 5 pages.

*Primary Examiner* — Scott W Dodds
(74) *Attorney, Agent, or Firm* — NIXON & VANDERHYE

(57) ABSTRACT

The disclosure relates to a process for manufacturing an optical article, including: providing an optical article manufactured by additive manufacturing, the optical article having a first main surface and a second main surface; providing at least one added value film including at least one added value layer; and attaching the at least one added value layer onto at least one of the two main surfaces of the optical article by laminating the at least one added value film onto the at least one main surface.

9 Claims, 1 Drawing Sheet

(51) Int. Cl.
*B33Y 80/00* (2015.01)
*G02C 7/02* (2006.01)
*B32B 37/12* (2006.01)
*B33Y 10/00* (2015.01)

(52) U.S. Cl.
CPC .. *B29D 11/00403* (2013.01); *B29D 11/00442* (2013.01); *B33Y 80/00* (2014.12); *G02C 7/02* (2013.01); *B32B 2037/1253* (2013.01); *B32B 2305/74* (2013.01); *B32B 2551/00* (2013.01); *B33Y 10/00* (2014.12)

(58) Field of Classification Search
USPC ..................................................... 156/307.1
See application file for complete search history.

(56) References Cited

U.S. PATENT DOCUMENTS

| | | |
|---|---|---|
| 2003/0116872 A1 | 6/2003 | Klemm et al. |
| 2007/0270062 A1 | 11/2007 | Weber |
| 2008/0023137 A1* | 1/2008 | Jiang ................ B29D 11/00355 156/701 |
| 2015/0241714 A1* | 8/2015 | Allione .............. B29D 11/0073 351/159.73 |
| 2016/0161761 A1 | 6/2016 | Quere et al. |
| 2016/0167299 A1 | 6/2016 | Jallouli et al. |
| 2016/0167323 A1* | 6/2016 | Valeri .............. B29D 11/00432 264/2.6 |
| 2018/0272597 A1* | 9/2018 | Biskop ................. B29C 64/112 |
| 2019/0231519 A1* | 8/2019 | Kuiper ................ G02B 26/005 |

* cited by examiner

PROCESS FOR MANUFACTURING AN OPTICAL ARTICLE WITH AN ADDED VALUE FILM

This application is the U.S. national phase of International Application No. PCT/EP2020/067518 filed Jun. 23, 2020 which designated the U.S. and claims priority to EP patent application Ser. No. 19/305,821.1 filed Jun. 24, 2019, the entire contents of each of which are hereby incorporated by reference.

BACKGROUND OF THE INVENTION

Field of the Invention

The disclosure relates to a process for manufacturing an optical article with an added value film.

This disclosure involves additive manufacturing and transfer process or lamination of films to get a finished optical lens with added values such that of hard-coat and/or anti-reflective or any other added values commonly used in the ophthalmic field.

Description of the Related Art

Such a transfer process is for example described in U.S. Pat. No. 7,455,796 and in US2003/0116872 and the lamination technic is for example described in WO2006105999.

The current process uses multiple steps:

First, the lens is obtained by injection molding or casting, said lens could be finished (meaning that the two optical surfaces are ready to use) or a semi-finished lens with one optical surface ready to use, said lens having to be machined to obtain the finish Rx product.

Then, the lens is hard coated by dip coating or Spin coating.

At last, an antireflective coating is deposited using vacuum deposition, sputtering or spin AR coating.

The lenses, or at least coated semi-finished lenses, are usually manufactured and coated prior to any order from a customer.

This process is using a large number of SKU (Stock-Keeping Unit), such as finished lenses, or semi-finished lenses, with different combinations of base, diameter, optical power and combination added values and/or semi-finished lenses with different combinations of base, diameter, optical design of the finished face and added values of said finished face. The processes for those coatings further involve a large foot print for the different equipment and ancillaries such as clean room, tests for process control and possible waste management systems.

A process pursuant to the disclosure allows a lens manufacturing by simplifying all the steps involved, and thus enable to reduce the number of SKU.

SUMMARY OF THE INVENTION

An object of the disclosure is a process for manufacturing an optical article, comprising:
a. Providing an optical article manufactured by additive manufacturing, the optical article having a first main surface and a second main surface;
b. Providing at least one added value film comprising at least one added value layer,
c. Attaching the at least one added value layer onto at least one of the two main surfaces of the optical article by laminating said at least one added value film onto said at least one main surface.

The originality of such a process is on one hand, the manufacturing of an optical article by additive manufacturing, and on the other hand, the attachment of the added value layer by laminating the added value film on at least one main surface of the optical article. The step of laminating said at least one added value film onto said at least one main surface, may be carried out for example by using a bonding layer which may be an external specific glue or adhesive layer, or may be an external layer of the material used for manufacturing the optical article by the additive manufacturing technic, said external layer being still in the liquid or intermediate state or gel state and thus adapted for acting as a glue for attaching said film, for example by using a later polymerization step of said external layer. In specific embodiments, the step of laminating the added value film can be carried out by means of the same material as the one used during the additive manufacturing, either by using an external layer which is still in a liquid or gel state resulting from the additive manufacturing step, or by specifically adding a layer of said material in a liquid or intermediate state or gel state after said additive manufacturing step. The material used to manufacture an optical article by additive manufacturing is for example a resin, and in particular a photo-reticulable polymer composition. In a process pursuant to the disclosure, the added value film may be laminated to either the first main surface, or the second main surface, or both of said mains surfaces. Advantageously, the optical article is an ophthalmic lens or a glass intended to be mounted on a frame.

Here is a non-exhaustive list of what the film could be:

According to the wording of the present disclosure, "film", when used alone, refers to a single layer of thermoplastic material. According to an example, an added value film is a functional film; according to an example, a film is self-supporting.

According to an example, the film is a thermoplastic film made of one of the following materials: poly(methyl methacrylate) (PMMA), acrylonitrile butadiene styrene (ABS), polyamides, polylactic acid (polylactide), polybenzimidazole (PBI), polycarbonate (PC), polyether sulfone (PES), polyether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC), polytetrafluoroethylene (PTFE), cellulose triacetate (TAC), cellulose acetate butyrate (CAB), poly(ethylene terephthalate) (PET), polyurethane (PU/TPU), cyclo-olefin copolymer (COC) and Polyimides. In an embodiment, the material of the thermoplastic film of the disclosure is chosen in the list consisting of: polycarbonate (PC), poly (methyl methacrylate) (PMMA), polyethylene (PE), cellulose triacetate (TAC), poly (ethylene terephthalate) (PET), polyurethane (PU/TPU) and cyclo-olefin copolymer (COC).

The film is thin, i.e. less than 1 mm, and generally thinner than 500 µm, more preferably thinner than 300 µm. The film, in the case of the present disclosure, can be a plane film, or can comprise a part which is curved so as to form a pseudo-spherical calotte, which can also be called a dome.

Further, the thermoplastic film may rigid enough so as to be self-supporting.

According to an example, the pressure sensitive adhesive layer 20 and the film 30 are assembled as a multi-layered film. In the frame of the disclosure, "multi-layered film" refers to a pressure sensitive adhesive layer and a thermoplastic film which are parts of a unique stratified structure and where the pressure sensitive adhesive layer is arranged in contact with the thermoplastic film. It is clear that a multi-layered film could be also used with the material of manufacturing.

According to the wording of the present disclosure, "structured film" refers to a plurality of films or layers of material that are part of a stratified structure. According to an example, a structured film is a stratified structure comprising a first film of material and one or more individual film layer(s) having identical or different characteristic that are adhered or bonded together or additional layers having identical or different characteristics, while not being self-supporting by themselves. According to an embodiment of the present disclosure, the thermoplastic film is a part of a structured film that further comprises a coating.

the film is an added value film and thus can be a part of a structured film that further comprises one or more thermoplastic films bonded to the film and/or one or more coatings, said coatings being preferentially arranged on a face of the thermoplastic film opposite to another face of the thermoplastic film intended to be in contact with the bonding layer or pressure sensitive adhesive layer; even if in some case, a coating can be present in-between the thermoplastic film and the bonding layer or adhesive layer; wherein said one or more coatings are chosen as being one or more coating within the list consisting of a hard coat layer, a primer or anti-shock layer, a photochromic layer, a polarized layer, a liquid crystal-layer, an electro-chromic layer, an anti-static layer, a tinted layer, a selective filter for filtering one or more wavelength ranges, an anti-smudge layer, an anti-fog layer, an anti-rain layer, a hydrophobic layer, an interferential stack, such as an anti-reflective layer, a mirror or a reflective layer or layer reflective on a partial part of the visible spectrum or a combination thereof.

According to a possible characteristic of the disclosure, the added value film comprises either or both of a hard coat and an antireflective.

According to a possible characteristic of the disclosure, wherein the attaching step is carried out by means of at least one bonding layer which is formed by a layer of material which is partially or not cured. This at least one bonding layer can be for example a specific glue or adhesive, such as a pressure sensitive adhesive, having the suitable properties to attach the added value film onto at least one main surface of the optical article by a laminating technic. The at least one bonding layer may also be constituted by an external layer of the material used during the additive manufacturing and which is maintained in a liquid or gel state.

According to a possible characteristic of the disclosure, the process comprises providing the at least one bonding layer on at least one of the two main surfaces of the optical article and/or on the at least one added value film. What is very important in a framework of a process pursuant to the disclosure, is that there is at least one adhesive layer between the main surface of the optical article intended to receive the added value film and the added value layer of said film. By respecting this principle, all the variants of adhesive deposits are possible between the optical article and the added value film.

According to a possible characteristic of the disclosure, the at least one bonding layer is present on the at least one added value film before the attaching step.

According to a possible embodiment of the disclosure, in the providing of the optical article, the optical article manufactured by additive manufacturing has a partially cured or uncured outmost layer of material on at least one of the main surfaces, forming the at least one bonding layer. This outmost layer can be made, either with the same material as the one of the optical articles, or with a different material formed on the optical article during the additive manufacturing process. In this way, the step of obtaining the overlayer made from the adhesive, is included in the additive manufacturing process.

According to a possible characteristic of the disclosure, the at least one bonding layer is made of the same material as that of the optical article, or variation thereof. Accordingly, said material may be deposited during the additive manufacturing step or deposited on the finished device after the additive manufacturing step by external means, either by spin coat, spray, inkjet deposition, dipping . . . Etc In such case of deposition by external means, it can be done after a possible final curing, in which case the lamination step happens after the final curing.

By a variation of the additive manufacturing material, it is meant that the bonding material may not be exactly the same as the material of the additive manufacturing step, but a variation material which may have some variation in type and amount of additives which presence modify the polymerization rate, the tackiness or the viscosity or other similar features of the material, while having the same monomers or polymers in similar proportions, or monomers ones of the same type, expected to have similar properties.

According to a possible characteristic of the disclosure, the providing of the optical article comprises, during the additive manufacturing process, partially curing a part of an additive manufacturing material uncovered by a later cured part of additive manufacturing material so as to form at least one external layer of material which is only partially cured, said external layer comprising contiguous parts of additive manufacturing material from one or more layers, and adapted to act as the outermost layer of bonding layer for the attaching step, and during or following such attaching step, said process further curing the partially cured outermost layer of material. Accordingly this corresponds to having a bonding layer formed during the additive manufacturing process. In other words, a bonding layer formed during the additive manufacturing process may be obtained, either, after the additive manufacturing process, by not cleaning all the liquid material present on the additive manufactured device, and thus part of the liquid monomer clinging to the device is used as bonding material, or during the manufacturing process, a layer of material is specifically designed as such, either deposited expressly and/or a part of the external surface is specifically only partially cured, so as to be in a gel state, so that upon finishing to additive manufacturing process, the additive manufactured optical article it is at least partially coated by a gel.

A process pursuant to this embodiment of the disclosure takes advantage of the presence of the last layer of the material used to manufacture the optical article by additive manufacturing, which is still liquid or in an intermediate or gel state, and not yet hardened in the meaning of P Jacobs as understood by the additive manufacturing technical community (Paul F. Jacobs, *Fundamentals of stereolithography in International Solid Freeform Fabrication Symposium*, 1992). According to a further embodiment this last layer may include or be comprised of an overlayer of material that adheres to surfaces of the optical article during and after the additive manufacturing process and which is usually removed from any additively manufactured article, and which is, in this embodiment of the process, either not removed or only partially cleaned. In this way the last layer can act as a glue to attach the film to the optical article by lamination, before being completely cured.

Said otherwise, the last layer of the material used during the additive manufacturing may also be constituted by an actual last layer of the material used during the additive manufacturing and which is deposited on the article in a final step of the additive manufacturing process and is still in a liquid or intermediate or gel state, ie un-cured or only partially cured; alternatively it may be an external layer of gel or liquid material that adheres to surfaces of the optical article during and after the additive manufacturing and which is usually removed from any additively manufactured article, and is here, either not removed or only partially cleaned; in a third alternative, the external layer mentioned above is at least partially cleaned, and the at least partially cleaned optical article is cured or partially cured, and thereafter some of the material used during the additive manufacturing is re-applied onto at least one surface of the optical article, by dipping or spin coating or spraying.

According to a possible characteristic of the disclosure, the process comprises a step of a first partial final curing after depositing the at least one bonding layer. This first partial curing is tailored, in intensity and duration, to further cure and harden the material of the device while only partially curing the bonding material so that it stays tacky, or in a gel state and so as to not put it in a dry solid state.

According to a possible characteristic of the disclosure, the at least one bonding layer comprises at least two sub layers, a first sub layer provided before a partial curing, either deposited after or formed by the additive manufacturing process, and a second sub layer deposited after said partial curing using external means. A second partial curing may be applied to leave the second sub layer tacky and further cure and harden the material of the device and of the first layer. Such embodiment, of partially curing the device so as to leave it tacky or in gel state, or partially uncured, and deposit a further bonding layer, may be repeated multiple times.

According to a possible characteristic of the disclosure, the attaching step is carried out by means of multiple bonding layers, comprising one layer of the material of the additive manufacturing step, any further layer being made of the same material or by a variation material.

According to a possible characteristic of the disclosure, before providing the optical article, a treatment is already applied on a support, and the optical element is built by additive manufacturing on said support, forming a main surface, and the added value film is attached on said main surface.

According to a possible characteristic of the disclosure, an added value film is laminated on the partially or not cured outermost layer formed by additive manufacturing on each of the two main surface of the optical element. For this configuration the two main surfaces of the optical article have an overlayer partially or not cured formed during the additive manufacturing process, and an added value film is laminated successively on both main surfaces of the optical article According to a possible characteristic of the disclosure, the at least one added value film comprises at least one added value layer and a carrier film, the at least one added value layer being provided on said carrier film. The carrier film is useful to allow to easily handle the added value film without damaging it. In one embodiment, the carrier film is intended to be removed from the optical article, once the added value layer has been laminated onto the at least one main surface of the optical article. In this case, the carrier has only a temporary function, and this kind of carrier film doesn't need any specific optical properties and may even be opaque or hazy. In this case, the carrier film has only a temporary function which is to support the added value film so as to easily handle, store and/or to transport said added value film, while eliminating all risks of damaging said added value film.

According to a possible characteristic of the above-mentioned embodiment of the disclosure, during step c), the added value layer is between the carrier film and the optical article. With such a configuration, the carrier film does not disturb the lamination of the added value layer onto the main surface of the optical article because it remains outside the framework of said lamination. Moreover, once the added value layer has been robustly solidarized to one of the main surfaces of the optical article, for example through use of one of the bonding layers mentioned above, this carrier film can be easily removed from the optical article without perturbing the added value layer arrangement on said optical article if needed.

In any of the embodiments mentioned above, the added value layer may be by itself a structured film having at least one thermoplastic film.

According to a possible characteristic of the disclosure, the carrier film is configured to be maintained attached onto the optical article after step c). In this configuration, the carrier film is an integral part of the optical article after the lamination of the added value film. Advantageously the carrier film creates a very thin layer, which will not have any influence on the optical properties of the optical article and which will not increase significantly the sizes of said article. In such case, the carrier film and the added value layer form together an added value film within the sense of the disclosure. The carrier film itself may further have some properties of added values, such as being adapted to be an anti-shock layer, a tinted layer, a filter for at least a specific wavelength range, a polarized film, a photochromic film, a partial mirror or a combination thereof.

According to a possible characteristic of the disclosure, the additive manufacturing is carried out by means of the stereolithography manufacturing technic, known as SLA, or by means of the inkjet 3D printing technic, or by means of the fused deposition modelling also called fused filament fabrication.

According to a possible characteristic of the disclosure, the process comprises a step of a final curing, to finish the polymerization of all the additive manufacturing material of the device. Advantageously, this step of a final curing is applied after the lamination step.

Another object of the disclosure is an optical article manufactured by a process according to the disclosure, comprising a first main surface and a second main surface, wherein said optical article is manufactured by additive manufacturing and wherein an added value film having an added value layer is laminated onto at least one said main surfaces so that the added value layer is attached to said at least one main surface.

A process pursuant to the disclosure has the advantages to be:
 Fast, because all treatments are pre-made on the support in mass production and stored in a shop or lab. Then applied on demand,
 Simple and easy to implement, because it does not request equipment to apply coating and ancillary associated with the coating/treatment equipment (clean room, test facilities, waste management . . . )

Low cost and low inventory to process the range, the lenses being manufactured on demand, thus reducing the number of sku, and allowing for a reduction of the number of machines needed for applying the added values.

BRIEF DESCRIPTION OF THE DRAWINGS

We give hereafter a detailed description of a preferred embodiment of a process pursuant to the disclosure, by referring to the following figures.

DESCRIPTION OF THE PREFERRED EMBODIMENTS

Figure 1:
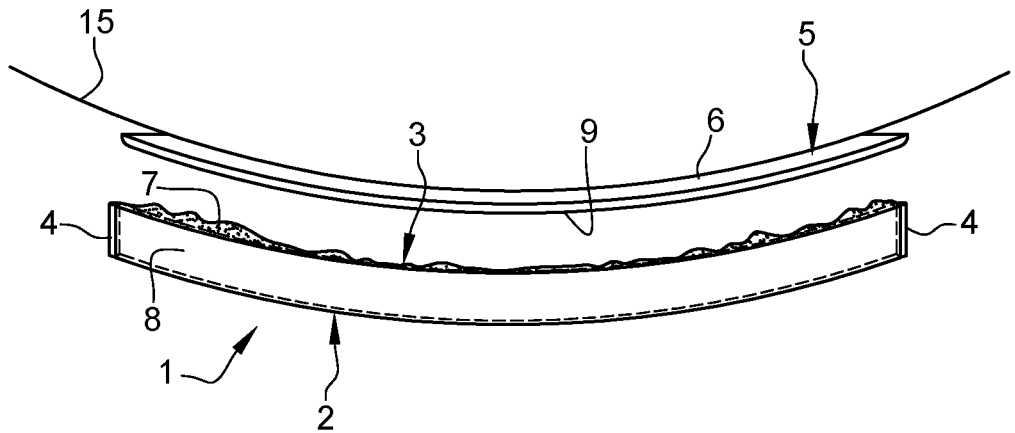
FIG. 1 is a sectional view of a first example of an optical article manufactured by a process pursuant to the disclosure.

Transparency of a spectacle lens is a relevant quality index of a optical article according to the disclosure, and more so for ophthalmic lenses.

Within the scope of the disclosure, an optical component is considered to be transparent when the observation of an image through this component is perceived without significant loss of contrast. Stated otherwise, the inter-position of a transparent optical component between an image and an observer of the latter does not significantly reduce the quality of the image. This definition of the term transparent is applicable, within the meaning of the disclosure, to all the objects regarded as such in the description and applies when an article is regarded has having no specific optical properties likely to diminish the optical quality. In a particular case this definition is considered as met if the optical article has a haze lower than about 1.

Further, notwithstanding the haze value, an optical device needs to have a sufficient optical quality.

By additive manufacturing it is meant a manufacturing technology as defined in the international standard ASTM 2792-12, which mentions a process of joining materials to make objects from 3D model data, usually volume unit per volume unit, for example layer upon layer, as opposed to subtractive manufacturing methodologies, such as traditional machining. The additive manufacturing method may be selected in, but is not limited to, the list consisting of stereolithography (or SLA), mask stereolithography or mask projection stereolithography, polymer jetting, scanning laser sintering or SLS, scanning laser melting or SLM, fused deposition modeling or FDM.

Lamination is a well-known technique of manufacturing a part comprising layers bonded together. It thus includes transferring and gluing said layers onto a surface so as to dispose or fix them on said surface. Pressure is applied on the film and a possible bonding layer during the lamination step. Patent application WO 2006/105999 discloses an apparatus for laminating a film onto an ophthalmic lens which may be suitable to implement the present disclosure. According to an example, pressure on the layers is greater or equal to 1 bar, as for an example pressure is comprised between 2 bars and 3 bars; according to an example, pressure is applied on the layers for a time period comprised between 30 seconds and 2 minutes. If the process doesn't need a pressure sensitive adhesive, the pressure needed might be less important.

Within the scope of the disclosure, an optical component is herein defined as one of an ophthalmic lens which is a lens which is designed to fit a spectacles frame so as to protect the eye and/or correct the sight. Non-limiting examples of ophthalmic lenses include corrective and non-corrective lenses, including single vision or multi-vision lenses, which may be either segmented or non-segmented, as well as other elements used to correct, protect, or enhance vision and protective lenses or visors such as found in spectacles, glasses, goggles and helmets. Non-limiting examples of display elements and devices include screens and monitors. Non-limiting examples of windows include automotive and aircraft transparencies, filters, shutters, and optical switches. The optical article of the present invention is preferably a lens, and more preferably an ophthalmic lens.

Added values under the meaning of the disclosure are layers or elements that modify the mechanical or optical properties of the ophthalmic lens without influencing the optical power of said ophthalmic lens. A non-exhaustive list of added values can be found hereafter: anti-scratch layers, also called hard-coats or abrasion resistant coatings, anti-shock layers, sometimes called primer layers or coatings, tinted layers or dyes, photochromic layers or dye, polarized layers, antistatic layers, anti-reflective layers or stacks, mirrors or partial mirror layers, filtering layers that selectively absorb or reflect one or more wavelength range within the near Ultraviolet, the visible or near infra-red wavelength ranges, hydrophobic, hydrophilic or oleophobic layers, also known as anti-smudge or anti-fog layers, and also active layers comprising liquid crystals or other elements activated by an electric signal.

A process pursuant to the disclosure for manufacturing an optical article, comprises the following Providing an optical article 1 manufactured by additive manufacturing, the optical article having a first main surface 2 and a second main surface 3. Advantageously, the first 2 and the second 3 main surfaces of the optical article to obtain, are curved, and are linked by a peripheral edge 4 extending along a revolution axis of the two main surfaces 2, 3. Preferably, the additive manufacturing is carried out by means of the stereolithography technic (SLA) or by means of the jet printing technic, which are already well-known technics.

In the stereolithography technic, the optical surface is built layer by layer, leaving on most layers along the predetermined surface of the optical article a part that is only slightly polymerized and which will be adapted to act as part of a bonding layer for the transfer or lamination step. During such a process, such external layer is in a liquid state or an intermediate state or gel state. The polymerization of relevant parts of the layers of resin is ensured by an UV irradiation. In the case of double side lamination or transfer, the same process will be replicate on the other side of the optical article.

In the same way, in the jet printing technic, a last layer may undercured and contains reactive function that will react with reactive function contained in a primer coating present on a carrier film or will react to form a bonding layer. In other words, during such a process, the last layer is in a state of liquid or gel, before being completely cured by an UV irradiation.

Since stereolithography technic and jet printing technic are well-known technics, they will not be disclosed in detail in the present patent application.

Providing at least one added value film 5 comprising at least one added value layer 6. Typically, the added value film 5 comprises a hard coat layer (HC) and/or an antireflective layer or stack (HMC). More generally, the added value film comprises for example at least one layer comprising an added value. The added value film 5 comprises at least a film made of thermoplastic and an added value layer, which can, in some case be the thermoplastic film or be a further layer; the added value layer will have approximately the same sizes as those of the main surface of the optical article on which it is intended to be deposited or at least a size similar to a size that the optical article is supposed to have once mounted in spectacle frames. In one embodiment, the film is rigid and have the same curvature as the one of the two main surface 2, 3 of the optical article.

Attaching the at least one added value layer 6 onto at least one of the two main surfaces 2, 3 of the optical article 1, by laminating said at least one added value film 5 onto said at least one main surface 2, 3. This step of attaching the at least one added value layer 6 onto at least one of the two main surfaces 2, 3, is carried out by means of at least one adhesive layer 7 which is interposed between said added value layer 6 and the main surface 2, 3 concerned. This results in several configurations:

Either the adhesive layer is directly deposited on the film 5 before the lamination step, Either the adhesive layer is directly deposited on the main surface 2, 3 of the optical article 1 intended to receive the film, before the lamination step, Either the adhesive layer is directly deposited on both the main surface 2, 3 of the optical article 1 intended to receive the film 5, and the added value layer 6 of said film 5. For this specific configuration, there are two separate adhesive layers 7 intended to come in contact with each other.

The adhesive material may be constituted by a suitable glue or adhesive layer, having the required properties to cleanly and securely attach the added value layer 6 of the film 5 to the main surface 2, 3 of the optical article 1. The adhesive layer may for example be a pressure-sensitive adhesive.

Pressure-sensitive adhesive, also called "PSA", are known in the field of optical devices to arrange a film onto a surface of an optical article while preserving the dioptric properties of the optical article. It is noteworthy that the mechanism of adhesion involved in this type of adhesive material does not involve chemical bonding but exploits the particular viscoelastic properties of the PSA material. These properties that are intrinsic to each PSA formulation make it possible to establish Van der Waals electrostatic interactions at the interface of adhesion. This is what is produced when the PSA is placed in contact with a solid material with the application of pressure.

But, the principle of a process pursuant to another embodiment of the disclosure, is to arrange for an overlayer 7 of the material used during the additive manufacturing to be still in a liquid or intermediate or gel state on either or both of the main surfaces prior to the lamination, and which would thus act as the adhesive material of the bonding layer. Indeed, the optical article 1 which is obtained by additive manufacturing, is manufactured by applying successive layers (or droplets) of a polymerizable material, each layer being initially in the liquid state and then being further cured. Accordingly, an outermost layer 7 will be inevitably formed on the desired optical article geometry, during the additive manufacturing process. According to a process pursuant to said embodiment, before said outermost layer 7 is completely cured, that is to say while this outermost layer is still in the liquid or intermediate or gel state, and still in contact with the optical article, the added value film 5 is applied against said outermost layer 7.

The contact between the film 5 and said outermost layer 7 is facilitated because the film 5 and the optical article 1 have a similar curvature. It is then sufficient to wait a few moments for the layer to harden under stimulation of curing energy, to obtain an optical article having additional optical properties, like for example hard coat and antireflective.

As a variation, the overlayer 7 of the material used during the additive manufacturing, may be replaced by a variation of the additive manufacturing material, either deposited during the additive manufacturing process or afterwards. By variation material, it is meant that the bonding material may not be exactly the same as the material of the additive manufacturing step, but a variation material which may have some variation in type and amount of additives which presence modify the polymerization rate, the tackiness or the viscosity or other similar features of the material, while having the same monomers or polymers in similar proportions, or monomers ones of the same type, expected to have similar properties. This may be applied mutatis mutandis to embodiments below.

In a further variation, the overlayer 7 of material used during the additive manufacturing, or a variation thereof, is deposited on the finished optical article after the additive manufacturing step by external means, either by spin coat, spray, inkjet deposition, dipping . . . Etc In such case of deposition by external means, it can be done after a possible final curing, in which case the lamination step happens after the final curing. This may be applied mutatis mutandis to embodiments below.

In another embodiment of a process pursuant to the disclosure, the added value film 5 is a structured film which comprises a carrier film (no visible on the figures) and at least one further layer, which can help an operator to handle and/or to transport the at least one further layer of the added value film without damaging said added value film 5. The added value film is then applied onto the corresponding main surface with the at least one other layer being interposed in between the carrier film and the corresponding main surface. Once the assembly constituted by the carrier film and the at least one other of the added value film 5 has been attached to the corresponding main surface 2, 3 this carrier film can, either be removed from the optical article 1, either stay in said optical article 1. If the carrier film is to be removed the carrier film does not need having any optical property as it will not have any influence on the optical quality of the final optical article. In an example, the at least one other layer comprises a thermoplastic film.

Referring to FIG. 1, in a first example, the manufacture of the optical article 1 starts from a pre-form 8 with a treatment (HC or HMC) already applied on the first main surface 2, the bulk of the lens having been built by additive manufacturing, and thus having an additively manufactured main optical surface on the second main surface 3. During this step of additive manufacturing, an outer layer 7 of the optical article 1 is still in a liquid or intermediate gel state on said second main surface 3.

Thereafter a stack of added values layers is transferred onto the second main surface 3 of the optical article 1, using an added value film 5.

The added value film 5 that will be used during the transfer is a structured film comprising a carrier film 15 and an HMC (hard multicoat), arranged in the following order, starting from the carrier film 15: a top coat that will be used for anti-smudge, antireflective layers, a hard coat and a primer 9 that will be the last layer to be glued with the outer layer 7 of the optical article 1 made by additive manufacturing. It is further possible to have a barrier coating or a sliding PSA or a demoulding agent between the carrier film 15 and the stack of added value layers.

The added value film is transferred after conformation onto the second main optical surface 3 to be coated, with the primer 9 being directed toward the optical surface to be coated. The transfer is done by a lamination step of laminating the added values layers onto the second main surface 3 to be coated, using the primer coating as a bonding layer. Such primer coating is thereafter polymerized thanks to an UV irradiation to help fasten the added values layers to the optical surface 3. Thereafter, the carrier film 15, which is positioned as an outer layer on the added values layers and the optical element is removed.

Alternatively, the optical surface 3 may have an outermost layer, or overlayer, 7 formed of the material of the additive manufacturing process, in particular formed by additive manufacturing which may be used as a complementary bonding layer: either the last layer 7 of resin, as defined above, used for the optical surface is under cured, and the curing is completed after or during the lamination step, or a specific chemistry could be deposited on to the finished surface manufactured by additive manufacturing to soften and/or react with the primer 9 on the sacrificial film 5.

In said example, the carrier thermoplastic film 15 is a sacrificial film which is removed after applying the stack of added value layers.

Figure 2:
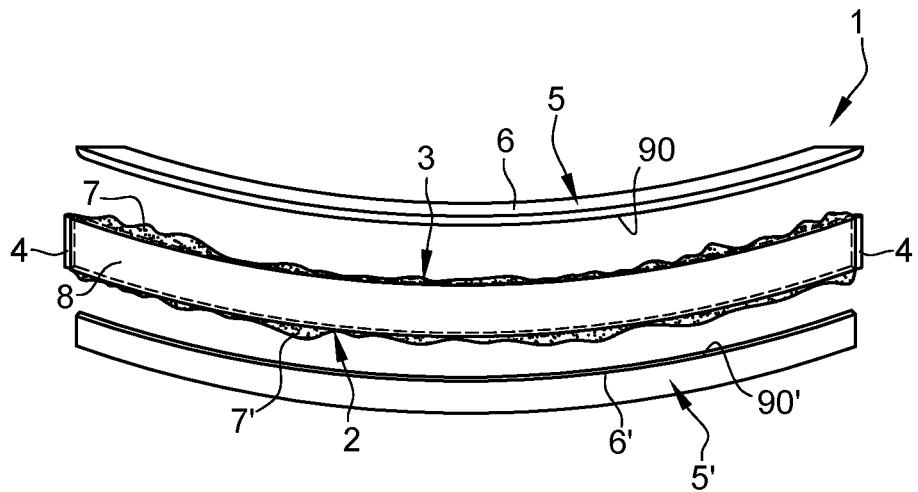
FIG. 2 is a sectional view of a second example of an optical article manufactured by a process pursuant to the disclosure.

Referring to FIG. 2, in a second example, the manufacture of the optical article 1, starts from a pre-form 8, and both main surfaces 2, 3 of finished optical article 1 were built by additive manufacturing to obtain a finished optical article 1 and are apparent.

Two added values films are transferred after conformation respectively onto the two main optical surfaces 2, 3 to be coated thanks to an outermost layers 7, 7' formed by additive manufacturing: either using outermost undercured parts of the layers of resin used to manufacture the optical main surface 2, 3, or applying in a second step an amount of the hardenable material used for the additive manufactured process onto said optical article.

The added values films 5, 5' may here comprise added values layers on top of a thermoplastic film 6, 6', the thermoplastic film 6, 6' being positioned so as to be in between the outermost layers 7, 7' and the added values layers 5, 5'. In such case the thermoplastic film 6, 6' enables to transport the added values layers, and help during the lamination of the layers onto the surface, either during thermoforming or while applying the layers on the main surfaces. Further, the thermoplastic film 6, 6' may bring by itself an added value function such as being a polarized film or a tinted film, or helping improve the shock resistance, or a crazing resistance of the optical article or facilitating drilling holes in the optical article.

In a variant, opposite the face of the thermoplastic film 6, 6' comprising the added values layers 5, 5', there may be a bonding layer 90, 90' adapted to react with the outermost layers 7, 7' formed of additive manufacturing material. Such bonding layer 90, 90', may be a primer coating, or a partially polymerised layer of material or a PSA layer . . . Etc.

It is to be noted that in a variant, such process may be used to apply an added value film on a single of the two main surfaces 2, 3.

Figure 3:
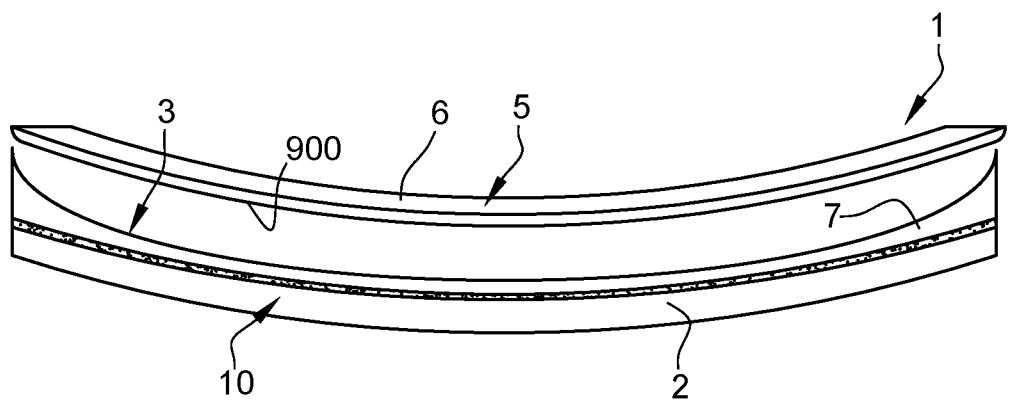
FIG. 3 is a sectional view of a third example of an optical article manufactured by a process pursuant to the disclosure.

Referring to FIG. 3, in a third example, the optical article 1 is directly built on a carrier film 10 bearing at least one added value layer using additive manufacturing before finishing the first main surface 3. Main surface 2 is therefore already covered by at least one added value layer.

An added value film is thereafter transferred after conformation onto the other optical main surface 3 to be coated thanks to the outermost uncured or partially cured layer 7 formed by additive manufacturing using any of the processes mentioned above.

Alternatively, the added value film may be laminated directly on the main surface 3 without use of an outermost uncured layer 7. Indeed, a PSA layer 900 may be present on the added value film, on a side of the thermoplastic film 6 opposite at least one added value layer. Alternatively, the PSA layer 900 may be applied onto the main surface 3 before laminating the added value film 1.

In cases above where the outermost layer 7, or partially cured layer 7 or overlayer 7 or a bonding layer is described as formed by additive manufacturing, it is meant that said layer is formed during the additive manufacturing process. It may be obtained, as non limiting examples, immediately after the additive manufacturing process, by not cleaning all the liquid material present on the additive manufactured device, and thus part of the liquid monomer clinging to the device is used as bonding material or during the additive manufacturing process, by providing specifically such material: for example a part of the external surface is specifically only partially cured, so as to be in a gel state, so that upon finishing to additive manufacturing process, the additive manufactured optical article it is at least partially coated by a gel.

In a variant, the added value layers already present on the main surface of optical article 1 opposite the main surface 3 to be coated have been deposited using traditional added value deposition processes, such as spin coating or dip coating or spray coating or vacuum deposition. Alternatively, the added values layers may have been present on a supporting surface used to manufacture the optical article 1. Alternatively, the added values layers may be present on an surface of a support optical article opposite a surface used as a supporting surface for additively manufacturing the optical article. The optical article and the support optical article forming together a complete optical article.

According to a possible characteristic of the disclosure, the process comprises a step of a final curing, to finish the polymerization of all the additive manufacturing material of the device. Advantageously, this step of a final curing is applied after the lamination step.

According to a possible characteristic of the disclosure, the process comprises a step of a first partial final curing after depositing the at least one bonding layer. This first partial curing is tailored, in intensity and duration, to further cure and harden the material of the device while only partially curing the bonding material so that it stays tacky, or in a gel state and so as to not put it in a dry solid state.

According to a possible characteristic of the disclosure, the at least one bonding layer comprises at least two sub layers, a first sub layer provided before a partial curing, either deposited after or formed by the additive manufacturing process, and a second sub layer deposited after said partial curing using external means. A second partial curing may be applied to leave the second sub layer tacky and further cure and harden the material of the device and of the first layer. Such embodiment, of partially curing the device so as to leave it tacky or in gel state, or partially uncured, and deposit a further bonding layer, may be repeated multiple times.

According to a possible characteristic of the disclosure, the attaching step is carried out by means of multiple bonding layers, comprising one layer of the material of the additive manufacturing step, any further layer being made of the same material or by a variation material.

In any of the embodiment presented above, it is possible to replace any of the lamination processes with any of the other ones depending on the needs and capability accessible to the manufacturer. Indeed, it is possible to implement variants with either a carrier film, with at least one added value layer in between the carrier film and the optical article after lamination, or with an added value film which integrating a thermoplastic film in-between at least one added value layer and the optical article. Further it is possible to use any of the disclosed types of bonding layers, depending on the needs and the capability available, such as using a PSA layer or a primer layer, or an outermost layer of additive manufacturing material, either formed by under-curing some parts of the layers forming the surface of the optical article during the additive manufacturing process or by adding a layer of such material immediately after the manufacturing of the optical article or a combination of two or more of those bonding layers.

The optical article of the disclosure formed by additive manufacturing may be in particular an ophthalmic lens or part of an optical article combining with a support optical article to form an ophthalmic lens.

A method for manufacturing an optical article pursuant to the disclosure further comprises a step of providing at least a supplementary layer on a surface of an optical article formed by additive manufacturing using at least a thermoplastic film, wherein said at least one supplementary layer is chosen within the list consisting of a further thermoplastic film, a hard coat layer, a primer layer, a photochromic layer, a polarized layer, a liquid crystal-layer, an electro-chromic layer, an anti-static layer, an interferential stack, such as an anti-reflective layer, a mirror or a reflective layer or layer reflective on a partial part of the visible spectrum, a tinted layer, a selective filter for filtering one or more wavelength ranges, an anti-smudge layer, an anti-fog layer, an anti-rain layer, a hydrophobic layer or a combination thereof.

The invention claimed is:

1. Process for manufacturing a finished optical lens designed to fit a spectacles frame, comprising:
    forming an optical article by additive manufacturing, the optical article being an optical lens designed to fit a spectacles frame and being made of an additive manufacturing material, wherein the optical article has a curved first main surface and a curved second main surface;
    applying an outermost layer of material on the curved first main surface, wherein the outermost layer of material is made of the additive manufacturing material or a variation thereof;
    partially curing the outermost layer of material;
    providing an added value film comprising at least one added value layer;
    attaching the at least one added value layer onto the curved first main surface of the optical article by laminating said added value film onto the partially cured outermost layer of material;
    during or following the step of attaching the at least one added value layer, further curing the partially cured outermost layer of material, thereby forming a finished optical lens designed to fit a spectacles frame and having the at least one added value layer on the curved first main surface;
    applying a second outermost layer of material on the curved second main surface of the optical article, wherein the second outermost layer of material is made of the additive manufacturing material or a variation thereof;
    partially curing the second outermost layer of material;
    providing a second added value film comprising at least one second added value layer;
    attaching the at least one second added value layer onto the curved second main surface of the optical 1 article by laminating said second added value film onto the partially cured second outermost layer of material; and
    during or following the step of attaching the at least one second added value layer, further curing the second partially cured outermost layer of material, thereby forming said finished optical lens further having the at least one second added value layer on the curved second main surface.

2. The process according to claim 1, wherein the added value film comprises at least one of a hard coat or an antireflective.

3. The process according to claim 2, further comprising, before the step of forming the optical article, applying a treatment on a support, and forming the optical article by additive manufacturing on said support.

4. The process according to claim 1, wherein at least one bonding layer is formed on the added value film before the attaching step.

5. The process according to claim 1, further comprising, before the step of forming the optical article, applying a treatment on a support, and forming the optical article by additive manufacturing on said support.

6. The process according to claim 1, wherein the added value film comprises at least one added value layer and a carrier film, the at least one added value layer being provided on said carrier film.

7. The process according to claim 6, wherein during the attaching step, the at least one added value layer is between the carrier film and the optical article.

8. The process according to claim 6, wherein the carrier film remains attached onto the optical article after the attaching step.

9. The process according to claim 1, wherein the additive manufacturing is carried out by means of the stereolithography manufacturing technic, known as SLA, or by means of the inkjet 3D printing technic, or by means of the fused deposition modelling also called fused filament fabrication.

* * * * *